(12) United States Patent
Curtis

(10) Patent No.: US 8,196,272 B2
(45) Date of Patent: Jun. 12, 2012

(54) CLAMP FOR HANGING THINGS

(76) Inventor: Brian Lee Curtis, Ionia, MI (US)

(*) Notice: Subject to any disclaimer, the term of this patent is extended or adjusted under 35 U.S.C. 154(b) by 489 days.

(21) Appl. No.: 12/404,697

(22) Filed: Mar. 16, 2009

(65) Prior Publication Data

US 2010/0064487 A1    Mar. 18, 2010

Related U.S. Application Data

(60) Provisional application No. 61/069,782, filed on Mar. 18, 2008.

(51) Int. Cl.
*F16B 2/10* (2006.01)

(52) U.S. Cl. ............... 24/513; 24/489; 24/494; 24/495; 24/496; 24/507; 24/516; 248/229.13; 269/41

(58) Field of Classification Search ............ 24/229.13, 24/489, 494, 495, 496, 498, 507, 516, 513; 248/229.13; 269/41
See application file for complete search history.

(56) References Cited

U.S. PATENT DOCUMENTS

| | | | |
|---|---|---|---|
| 80,894 A | 8/1868 | Anderson | |
| 371,349 A * | 10/1887 | Newell | 269/239 |
| 879,547 A * | 2/1908 | Holter | 269/54.2 |
| 887,103 A | 5/1908 | Lane | |
| 2,638,805 A * | 5/1953 | Bigelow | 269/3 |
| 2,921,486 A * | 1/1960 | Burke | 269/285 |
| 3,843,186 A | 10/1974 | Van de Wetering | |
| 4,021,516 A * | 5/1977 | Stevenson | 269/41 |
| 4,236,703 A * | 12/1980 | Stevenson | 269/41 |
| 4,463,482 A * | 8/1984 | Hawie | 24/489 |
| 4,489,466 A * | 12/1984 | Bakker | 24/489 |
| 4,884,836 A | 12/1989 | Maye et al. | |
| 5,139,231 A * | 8/1992 | Temple | 254/15 |
| 5,527,014 A * | 6/1996 | Bracewell | 254/15 |
| 5,636,819 A | 6/1997 | Kettlestrings | |
| 6,041,680 A * | 3/2000 | Wang | 81/409 |
| 6,877,731 B1 | 4/2005 | Corley, Sr. | |
| 6,964,085 B2 | 11/2005 | Boda | |
| 7,152,284 B1 * | 12/2006 | Greer et al. | 24/537 |
| 2004/0163723 A1 * | 8/2004 | Taylor et al. | 138/99 |

* cited by examiner

*Primary Examiner* — Robert J Sandy
*Assistant Examiner* — David Upchurch
(74) *Attorney, Agent, or Firm* — Price Heneveld LLP

(57) ABSTRACT

A clamp for hanging things, the clamp having a pair of jaws and a lever. Manipulation of the lever causes the jaws to either open or close, depending on the direction of manipulation. The lever is connected to one of the jaws and to a plate attachment. The attachment of the lever to the jaw rotates around the point of the lever's attachment to the plate attachment, the structure of the plate attachment defining the boundaries of the rotation. One jaw is connected to the other jaw at a point of pivoting.

6 Claims, 10 Drawing Sheets

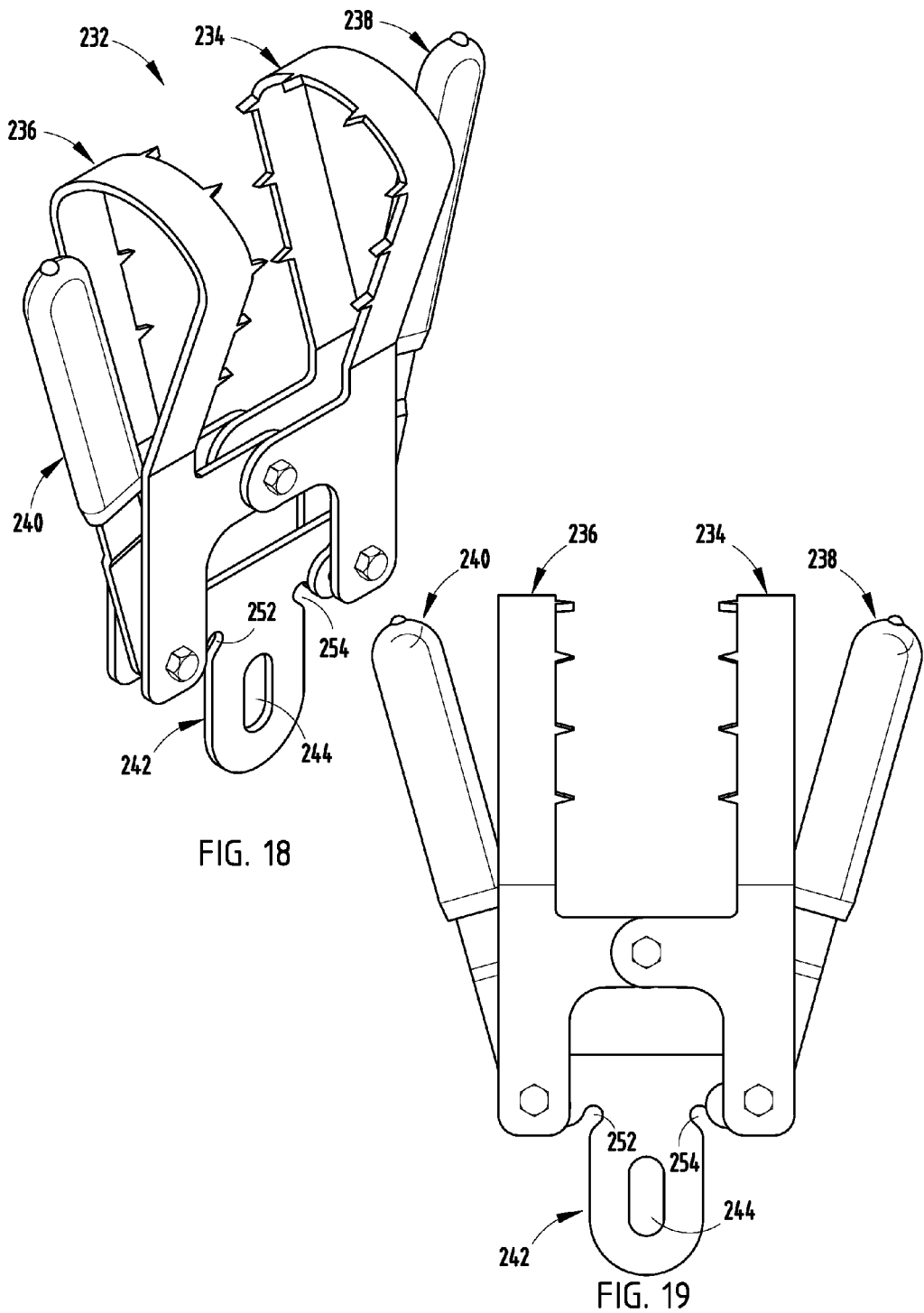

CLAMP FOR HANGING THINGS

This application claims priority to and the benefit of U.S. Provisional Application No. 61/069,782 filed Mar. 18, 2008 and said provisional application is incorporated herein by reference in its entirety.

BRIEF SUMMARY OF THE INVENTION

The objective of the clamp described herein is to allow the user to attach the clamp to a structure and hang things from the clamp or use the clamp to lift or pull things. One end of the clamp has compression areas. The compression areas have teeth. The other end of the clamp has an aperture. The aperture permits the user to hang something from the clamp, when the clamp is clamped to something. The side of the clamp has a lever. The lever forces the compression areas of the clamp to come together, that is, to compress whatever is between the compression areas. The teeth of the compression areas may proceed into the clamped material, to provide grip. The lever additionally causes the compression areas to release the clamped material. An alternative embodiment of the clamp, having two levers, is described herein, as well.

The user can attach the clamp to a variety of structures. Those structures include an exposed joist, a rafter, a stud, and any other structure from which a person may want to hang something.

The clamp is easy to use and versatile. Because the clamp only requires manipulation of the lever to set or release the clamp, the user can quickly move the clamp from structure to structure. In addition, because the clamp is robust and the compression areas have teeth, the user can permanently (at least until the user manipulates the lever to release the clamp) attach the clamp to a structure.

The clamp can be used in a variety of situations. For example, a home handyman could attach the clamp to a garage rafter, to assist the handyman in lifting an object from the handyman's truck. A farmer could attach the clamp to a rafter or fence to hitch livestock for bathing or grooming. A hunter could attach the clamp to an overhead structure and hang caught prey from the clamp. A builder could attach the clamp to a marked location on a structure for a stop or to hold lumber in place.

The clamp is compatible with accessories that expand the functional capabilities of the clamp. For example, a panel bracket is described herein. The panel bracket can be used in conjunction with the clamp to attach a piece of wood to the structure to which the clamp is attached, for example, to provide a temporary safety rail. In addition, extension brackets are described herein. The extension brackets enable the clamp to grip a wider structure than the clamp could without the extension brackets.

BRIEF DESCRIPTION OF THE SEVERAL VIEWS OF THE DRAWINGS

FIG. 18 shows a perspective view of a second embodiment of the clamp;

FIG. 19 shows a front view of the second embodiment;

DETAILED DESCRIPTION OF THE INVENTION

Figure 1:
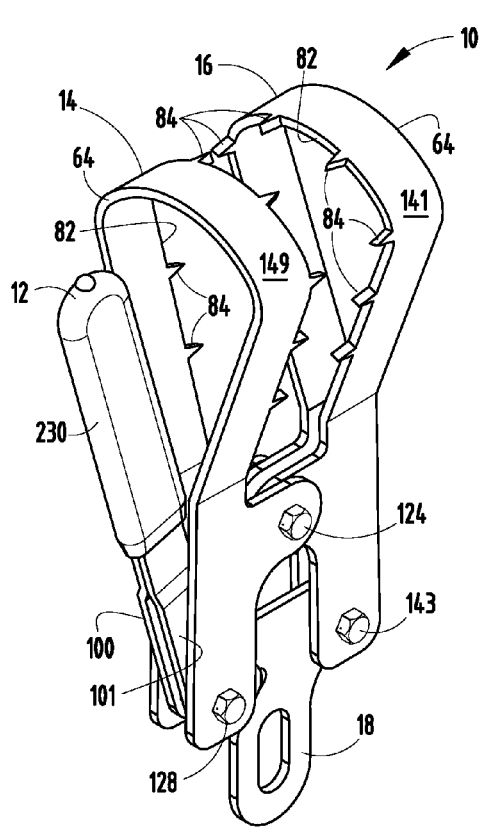
FIG. 1 shows a perspective view of a first embodiment of the clamp.
Figure 2:
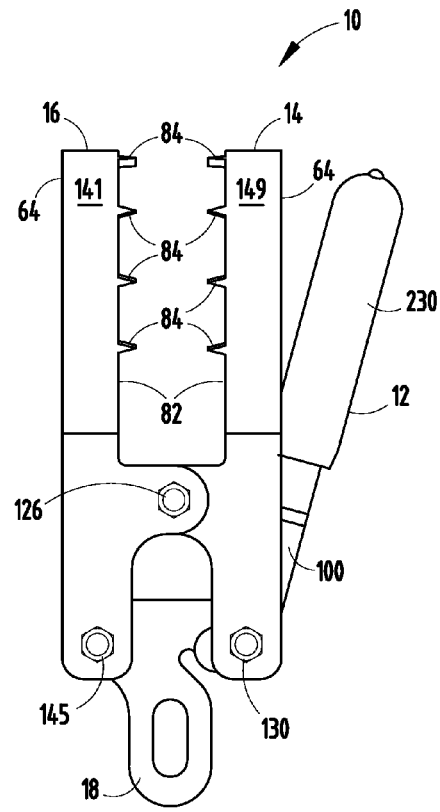
FIG. 2 shows a back view of the first embodiment.

The first embodiment of the disclosure is shown generally at FIGS. 1 and 2. Clamp 10 includes lever 12, first jaw 14, second jaw 16, and plate attachment 18.

Figure 3:
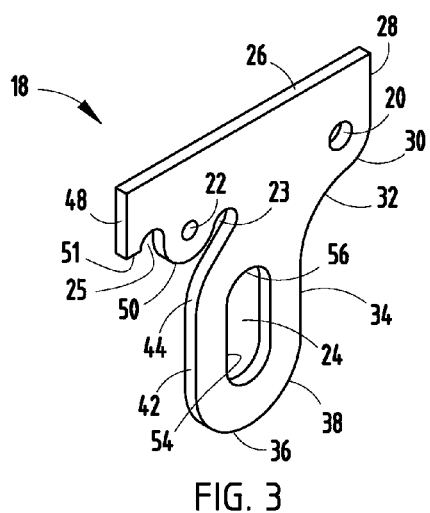
FIG. 3 shows a perspective view of the plate attachment used in the first embodiment.
Figure 4:
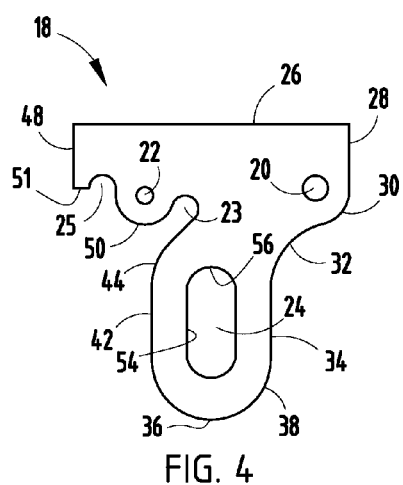
FIG. 4 shows a front view of the plate attachment.

As shown in FIGS. 3 and 4, plate attachment 18 can have aperture 20, aperture 22, aperture 24, recession 23, and recession 25. The plate attachment 18 can be made from a variety of materials, including high strength low alloy (HSLA, such as HSLA 50) steel, hot rolled steel, cold rolled steel, stainless steel, or powdered metal (such as FN-0208, an iron nickel/nickel steel mixture). In addition, high strength, high density plastics could be used, depending on the intended use of the clamp (for example, relatively light loads to be hung from the clamp). When steel is used, the plate attachment 18 can be finished with zinc clear chromate using barrel plating process. The plating process can require the use of a dimple on the part to be plated, to prevent the surface of one part from completely covering the surface of another part and thereby preventing plating. The dimple ought to be positioned so as not to interfere with the other parts of the clamp 10 during use.

The center of aperture 20 can be located approximately 0.65 inches from the plane defined by the first surface 26 and approximately 0.34 inches from the plane defined by the second surface 28. Aperture 20 can have a diameter of approximately 0.254 inches. Arc 30 can provide approximately ninety degree curvature transition at an approximate radius of 0.34 inches between second surface 28 and arc 32. Arc 32 can provide approximately ninety degree curvature transition at an approximate radius of 0.710 inches between arc 30 and third surface 34. Third surface 34 can begin at the end of the arc 32 and be approximately 0.700 inches long before transitioning to arc 38. Arc 38 can provide approximate 180 degree curvature transition at an approximate radius of 0.600 inches to transition between third surface 34 and fourth surface 42. Fourth surface 42 can provide the transition between arc 38 and arc 44 and be approximately 0.700 inches long. Arc 44 can provide an approximate forty-five degree transition between fourth surface 42 and recession 23 at a radius of approximately 0.170 inches. Recession 23 can provide an approximate 180 degree transition between arc 44 and arc 50 at an approximate radius of 0.135 inches. Arc 50 can provide an approximate 180 degree transition between recession 23 and recession 25 at an approximate radius of 0.295 inches. Recession 25 can provide an approximately 180 degrees transition between arc 50 and surface 51 at a radius of approximately 0.135 inches. The straight line distance between the mid-point of recession 25 and the plane defined by the fifth surface 48 can be approximately 0.295 inches. Fifth surface 48 can be approximately 0.65 inches long. First surface 26 can be approximately 2.795 inches long. The distance between the plane defined by first surface 26 and tip 36 can be approximately 3.00 inches. Aperture 22 can have a diameter of approximately 0.170 inches. Sixth surface 54 of aperture 24 can be approximately 0.625 inches. Arc 56 can be approximately 180 degrees with a radius of approximately 0.250 inches. Plate attachment 18 can be between 0.150 and 0.160 inch thick. The dimensions set forth above can vary, as long as the dimensions of the other components of the clamp 10 are adjusted as needed. For example, the recessions 25 and 23 could extend deeper into the body of attachment plate 18, to provide more range of movement for the first jaw 14 and second jaw 16. The aperture 24 could be larger or smaller, and have different dimensions to suit a particular need (such as a particularly shaped hook).

Figure 5:
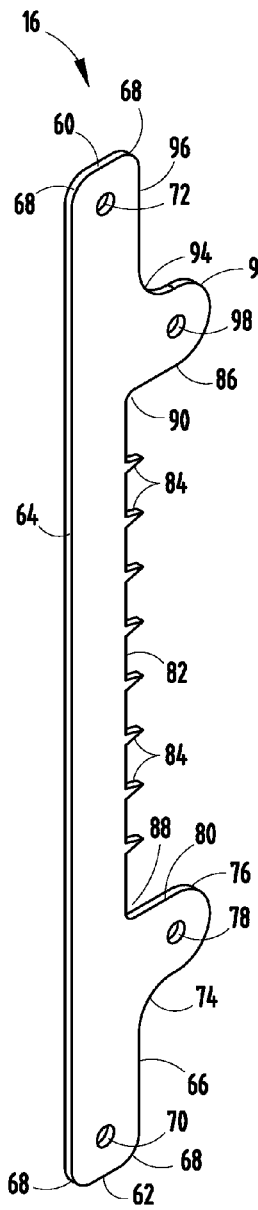
FIG. 5 shows a perspective view of the second jaw used in the first embodiment, before the second jaw is bent into shape.
Figure 6:
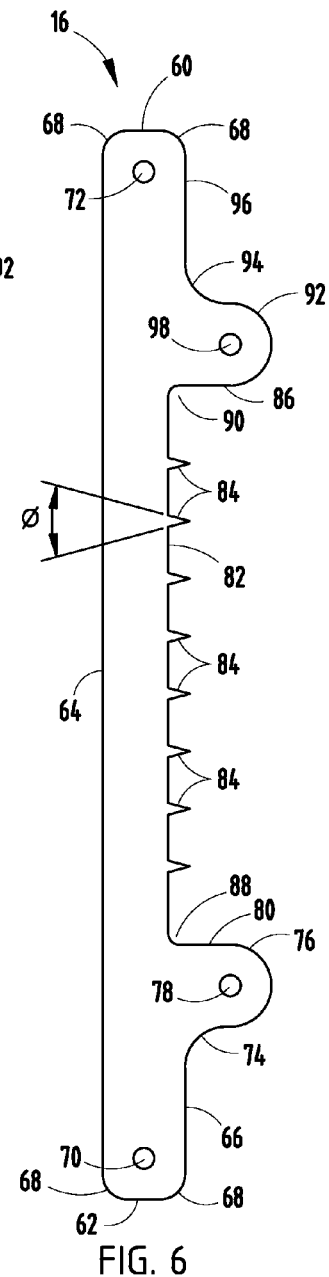
FIG. 6 shows a front view of the second jaw.

Second jaw 16 can be made from a flat piece of material before shaped into a jaw. The material, before shaping, is shown at FIGS. 5 and 6. The distance between first surface 60 and second surface 62 can be approximately 13.0 inches. The distance between third surface 64 and fourth surface 66 can be approximately 1.000 inch. The transition between third surface 64 and second surface 62 can be arched to prevent injury during use. For example, arcs 68 can provide an approximately forty-five degree arc transition with a radius of approximately 0.300 inches. The center of apertures 70 and 72 can be located approximately 0.500 inches from the planes defined by the second surface 62 and the first surface 60 respectively. The center of apertures 70 and 72 can be located approximately 0.500 inches away from the place defined by the third surface 64. Apertures 70 and 72 can have a diameter of approximately 0.254 inches (+/−0.002). Arc 74 can provide an approximately ninety degree transition between the fourth surface 66 and arc 76 at a radius of approximately 0.500 inches. Arc 76 can provide an approximately 180 degrees transition with a radius of 0.500 inches between arc 74 and fifth surface 80. The center of aperture 78 can be located approximately 1.550 (+/−0.004) inches from the plane defined by third surface 64 and approximately 2.600 inches away from the plane defined by second surface 62. Aperture 78 can have a diameter of approximately 0.254 (+/−0.002) inches. Fifth surface 80 can be approximately 3.100 inches away from the plane defined by second surface 62. Sixth surface 82 can be approximately 6.800 inches long and have teeth 84 (extensions away from sixth surface 82) that extend approximately 0.190 inches from the flat part of sixth surface 82, the tip of the tooth 84 closest to fifth surface 80 being approximately 0.950 inches from the fifth surface 80 and the tip of the tooth 84 closest to seventh surface 86 being approximately 0.95 inches from the seventh surface 86, with approximately 0.700 inches of space between the tips of the teeth 84. The angle Ø of the teeth 84 can be approximately thirty degrees. The transition between the fifth surface 80 and the sixth surface 82 can be arc 88 of approximately ninety degrees with a radius of approximately 0.125 inches. The transition between the sixth surface 82 and the seventh surface 86 can be arc 90 of approximately ninety degrees with a radius of approximately 0.125 inches. Arc 92 can provide an approximately 180 degree transition with an approximate radius of 0.500 inches between the seventh surface 86 and arc 94. Arc 94 can provide an approximate ninety degree transition with a radius of approximately 0.500 inches to provide a transition between arc 92 and eighth surface 96. Arc 68 can provide a transition between eighth surface 96 and first surface 60. Aperture 98 can have a diameter of approximately 0.254 inches. The center of aperture 98 can be approximately 1.550 (+/−0.004) inches from the plane defined by third surface 64 and approximately 2.600 inches from the plane defined by first surface 60. Second jaw 16 can be between 0.095 and 0.103 inches thick. The dimensions of the second jaw 16 can vary from those described above, as long as the other components of the clamp 10 are adjusted accordingly. For example, the user may want to make third surface 64 and sixth surface 82 longer, to allow for more teeth 84 or wider teeth 84 and/or a greater area to apply compression force. The user can provide more or less teeth 84, depending on the intended use. The user can alter the angle Ø or shape of the teeth 84, in order to accommodate different surfaces on which the user will use the clamp 10.

Figure 7:
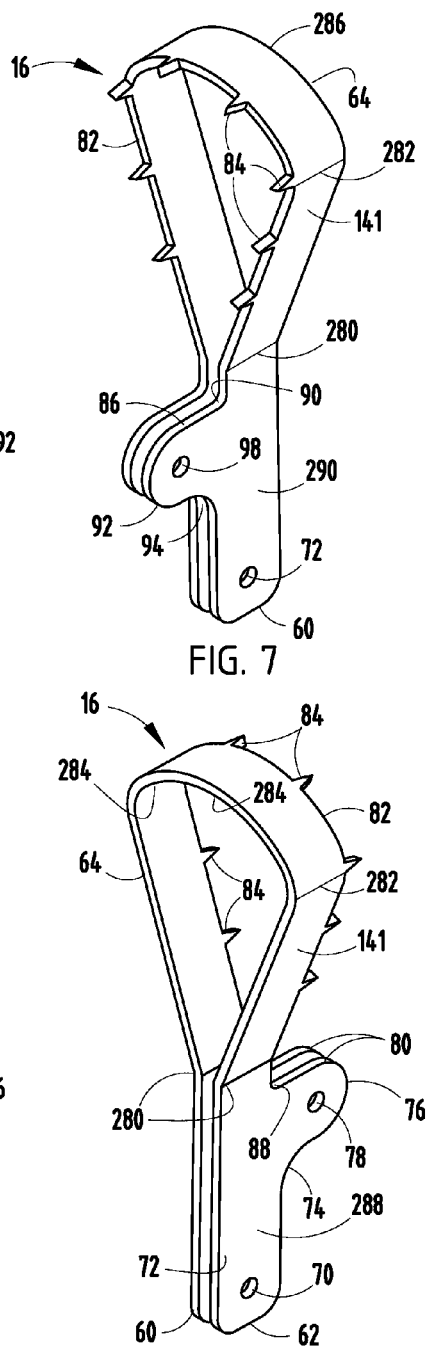
FIG. 7 shows a perspective view of the second jaw used in the first embodiment, after the second jaw is bent into shape.
Figure 8:
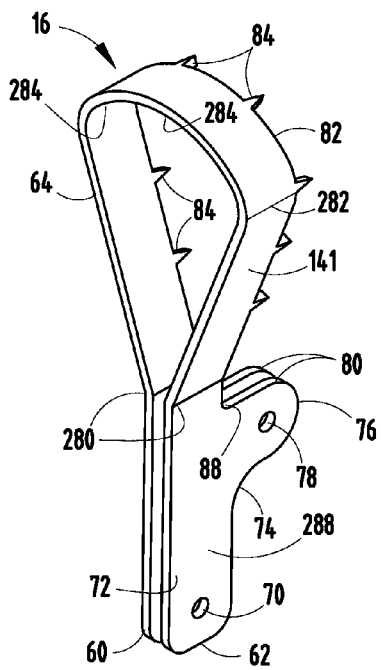
FIG. 8 shows a perspective view of the first jaw used in the first embodiment, after the first jaw is bent into shape.

Second jaw 16 can be shaped as shown in FIGS. 7 and 8. Second jaw 16 can be bent at bends 280. Bends 280 can occur at approximately 3.100 inches from first surface 60 and second surface 62, respectively. The angle of bends 280 can be the same. Second jaw 16 can be bent again at bends 282. Bends 282 can occur approximately 2.000 inches from bends 280. The portion of the second jaw 16 between bends 282 can be a developed radius or bent at several (such as three) points, such as bends 284. The distance between the plane defined by the intersection of bends 282 and the plane defined by the line tangential to tip 286 can be approximately 0.800 inches. The straight line distance between bends 282, after bending and including the thickness of second jaw 16 can be approximately 1.500 inches. After bending, the centers of apertures 78 and 98 can line up and the centers of apertures 70 and 72 can line up. After bending the distance between surface 288 and surface 290 can be approximately 0.420 inches. Second jaw 16 can be bent to form different shapes than that described above. For example, the user may want a more narrow second jaw 16 and decrease the angle of the bends 280 and 282.

First jaw 14 can be made from a piece of flat material having approximately the same dimensions as the flat material discussed in association with second jaw 16 above (and depicted in FIGS. 5 and 6). First jaw 14 can be shaped in accordance with the shaping of second jaw 16, described above. However, after bending, the distance between surface 288 and surface 290 can be approximately 0.620 inches.

First jaw 14 and second jaw 16 can be made from HSLA, hot rolled steel, cold rolled steel (such as 1010 grade and hardness range Rockwell b65-80), or stainless steel. In addition, high strength, high density plastics could be used, depending on the intended use of the clamp (for example, relatively light loads to be hung from the clamp). When first jaw 14 and second jaw 16 are made from steel, they can be vibratory deburred and plated with zinc clear chromate plating.

Figure 9:
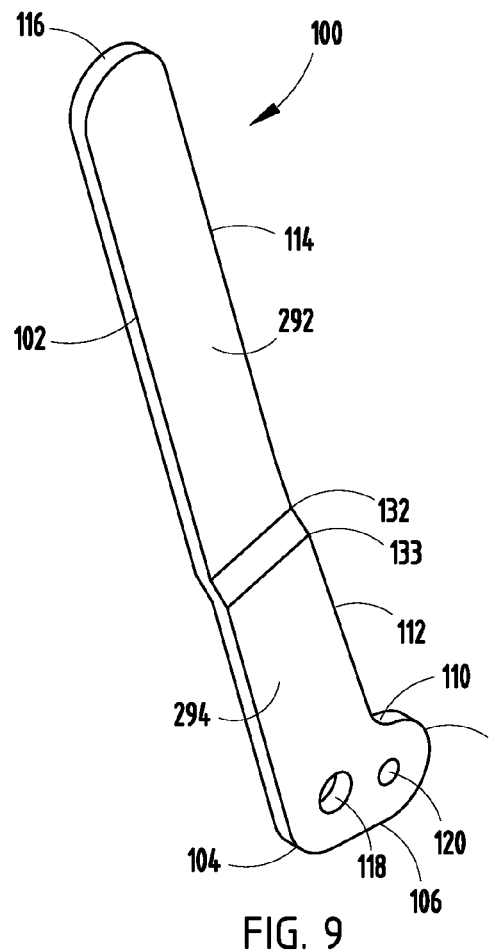
FIG. 9 shows a perspective view of the first piece of the handle used in the first embodiment.
Figure 10:
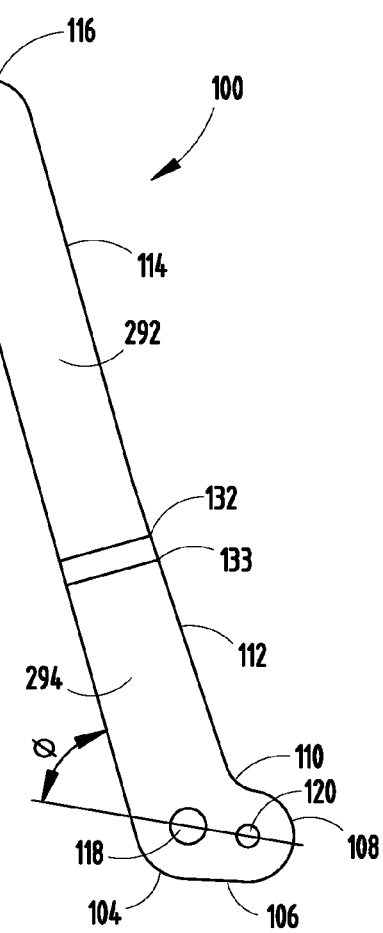
FIG. 10 shows a front view of the first piece of the handle used in the first embodiment.

Lever 12 can be made from two pieces of flat material. As shown in FIGS. 9 and 10, first piece 100 can have a first surface 102. First surface 102 can be approximately 5.250 inches long. Arc 104 can provide a transition between first side 102 and second side 106. Arc 104 can provide an arc of approximately eighty degrees with a radius of approximately 0.375 inches. Second surface 106 can be approximately 0.430 inches. Arc 108 can provide a transition between second surface 106 and arc 110. Arc 108 can provide an arc of approximately 180 degrees with a radius of approximately 0.325 inches. Arc 110 can provide a transition between arc 108 and third surface 112. Arc 110 can provide an arc of approximately forty-five degrees with a radius of approximately 0.250 inches. Third surface 112 can provide a transition between arc 110 and fourth surface 114. Third surface 112 can be approximately two inches long. Fourth surface 114 can provide the transition between third surface 112 and arc 116. Fourth surface 114 can be approximately 2.775 inches long. Arc 116 can provide the transition between fourth surface 114 and first surface 102. Arc 116 can provide an arc of approximately 180 degrees with a radius of approximately 0.325 inches. The center of aperture 118 can be approximately 0.375 inches from the plane defined by first surface 102 and approximately 5.575 inches from the mid-point of arc 116. Aperture 118 can have a diameter of approximately 0.254 inches. The center of aperture 120 can be approximately 0.430 inches from the center of aperture 118 in a straight line direction towards the mid-point of arc 108. Angle Ø can be approximately 65 degrees. Aperture 120 can have a diameter of approximately 0.158 inches. Second piece 101 can have the same dimensions as first piece 100. First piece 100 can be bent at bends 132 and 133, so that the plane defined by surface 292 is approximately 0.085 inches from the plane defined by surface 294. The bends 132 and 133 can allow the lever 12 to clear the plate attachment 18 when in use. Second piece 101 can be bent at bends 132 and 133, but in a mirror image fashion compared to first piece 100. Both first piece 100 and second piece 101 can be approximately 0.095 to 0.103 inch thick. First piece 100 and second piece 101 can have different dimensions that those set forth above. For example, the user may desire a longer or shorter lever and adjust the lengths of first surface 102 and fourth surface 114 accordingly. Similarly, the user can adjust angle Ø and the location of apertures 118 and 120, to suit particular needs.

Figure 11:
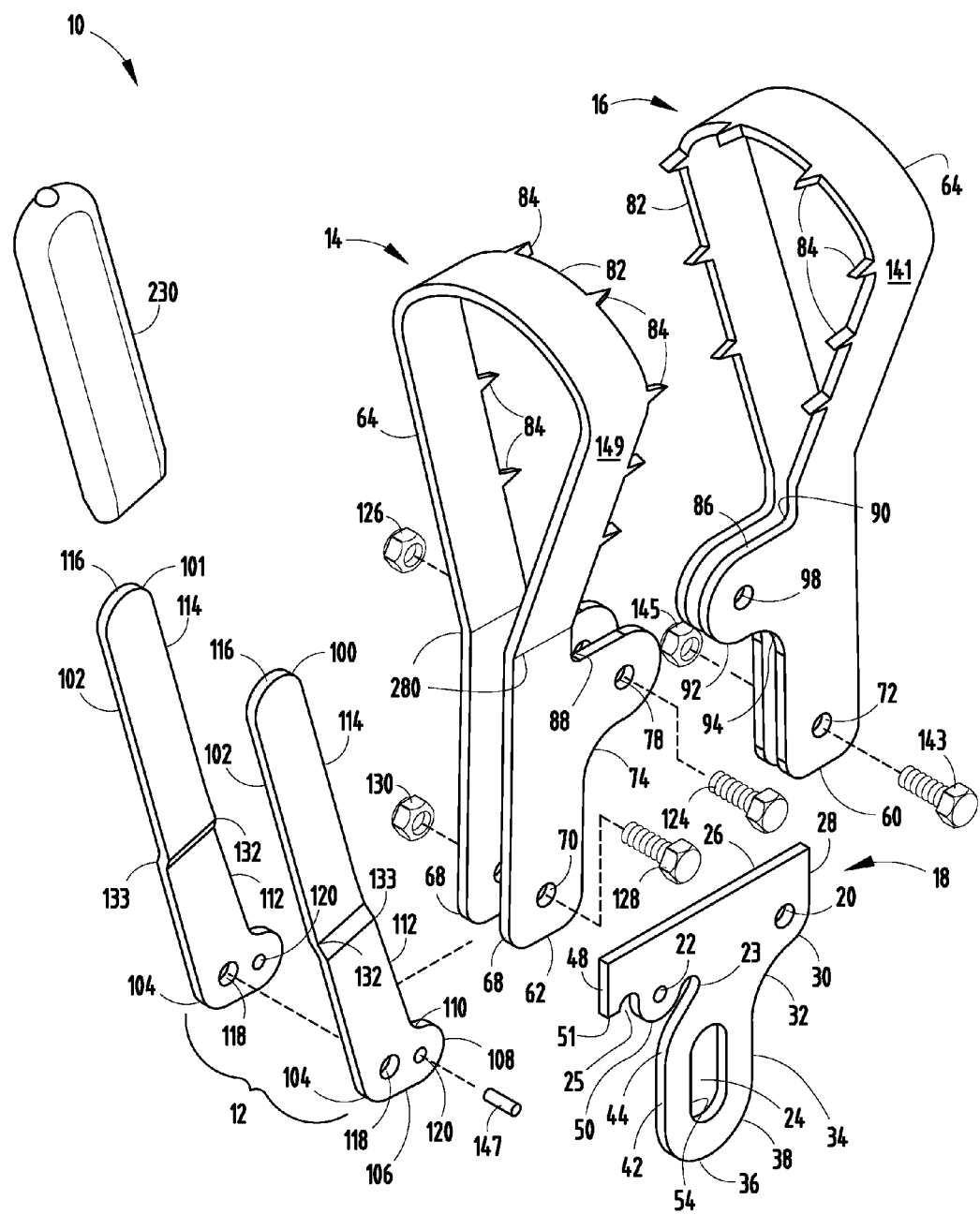
FIG. 11 shows a perspective exploded view of the first embodiment.

As shown in FIGS. 1 and 11, lever cover 230 can be placed over the both first piece 100 and second piece 102, at the general area of the lever 12 where arc 116 of the first piece 100 and second piece 102 are located. The lever cover 230 can be made from 75 durometer PVC, with a glossy finish. The lever cover 230 can be 0.065 inch thick, 0.50 inch in diameter, and 3 inches long with a rounded end. The lever cover 230 can be made of different materials, to suit different needs.

First piece 100 and second piece 101 can be made from a variety of materials, including high strength low alloy (HSLA) steel, hot rolled steel, cold rolled steel (such as 1010 grade and hardness range Rockwell b65-80), stainless steel, or powdered metal (FN-0208). When steel is used, the first piece 100 and second piece 101 can be finished with zinc clear chromate using barrel plating process. In addition, high strength, high density plastics could be used, depending on the intended use of the clamp (for example, relatively light loads to be hung from the clamp).

Figure 12:
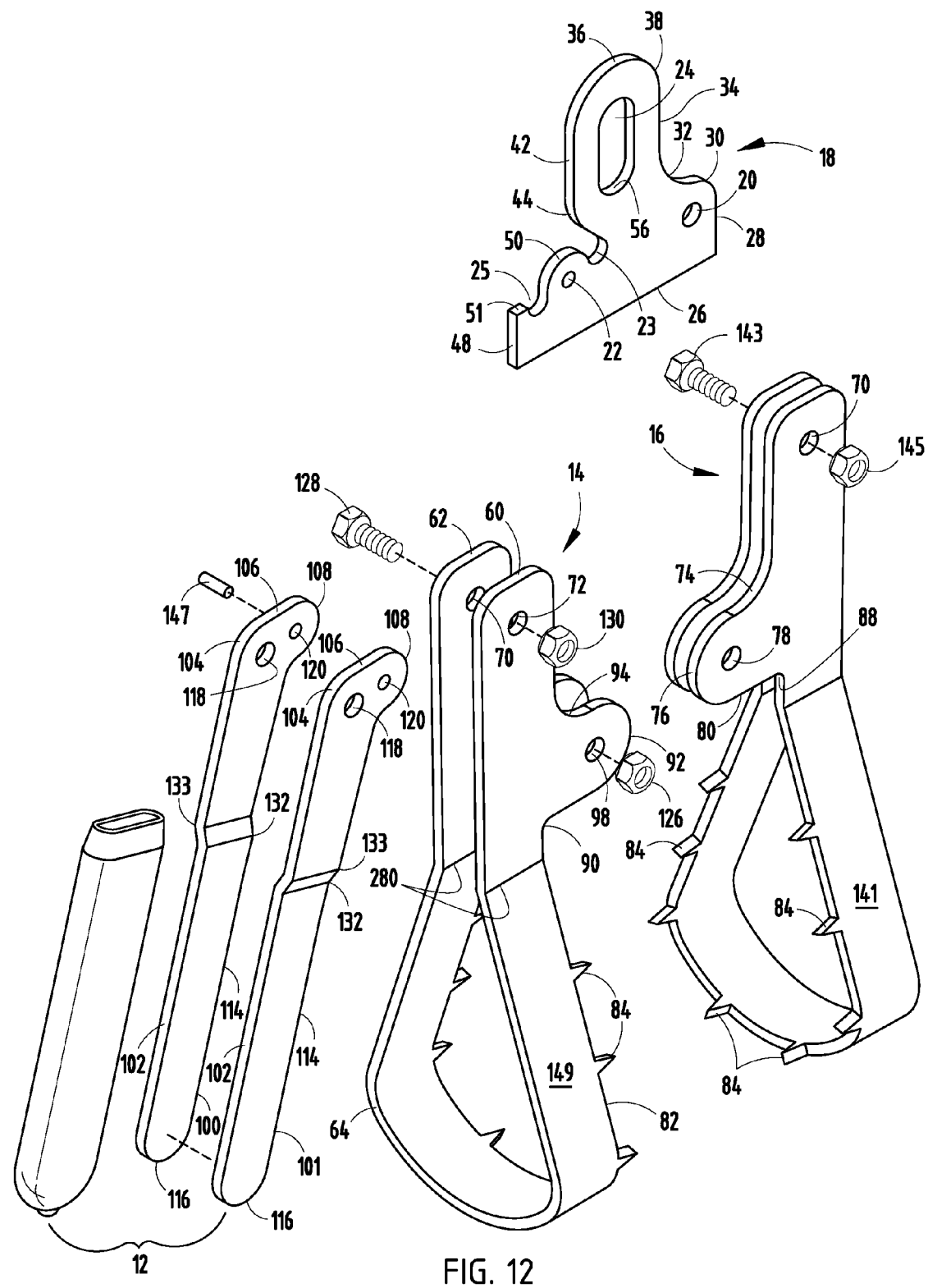
FIG. 12 shows another perspective exploded view of the first embodiment.

As shown in FIGS. 11 and 12, a threaded bolt 143 can be placed through aperture 72 at the second jaw 16, through aperture 20 of the plate attachment 18 and through aperture 70 at the second jaw 16, and a nut 145 can be fixedly attached to the threaded end of the threaded bolt 143. Plate attachment 18 should be allowed to rotate around treaded bolt 143. Threaded bolt 143 can take many forms, such as an axle or pin, and need not be threaded or a bolt. Nut 145 need not be a nut but can be any means to secure threaded bolt 143 within the apertures. In some instances, nut 145 may not be required, if the threaded bolt 145 is formed to be secure within the apertures.

A pin 147 can be placed through aperture 120 of the first piece 100 of the lever 12, through aperture 22 of the plate attachment 18, and through the aperture 120 of the second piece 101 of the lever 12. The ends of the pin 147 can be flattened to secure the pin 147 within the apertures. The first piece 100, the second piece 101, and the plate attachment 18 can be allowed to rotate around the pin 147.

Threaded bolt 124 can be placed through aperture 78 of the first jaw 14, through aperture 98 of the second jaw 16, through aperture 78 of the second jaw 16, and through aperture 98 of the first jaw 14. A nut 126 can be fixedly attached to the threaded end of the threaded bolt 124. First jaw 14 and second jaw 16 can be allowed to rotate around threaded bolt 124. As with the treaded bolt 143 and nut 145, threaded bolt 124 and nut 126 can take a variety of foams.

Threaded bolt 128 can be placed through aperture 70 of first jaw 14, through aperture 118 of first piece 100 of lever 12, through aperture 118 of second piece 101 of lever 12, and through aperture 72 of first jaw 14. A nut 130 can be attached to the threaded end of threaded bolt 128. First jaw 14 and lever 12 can be allowed to rotate around threaded bolt 128, the rotational movement defined by recession 25, arc 50, and recession 23 of the plate attachment 18. As with the treaded bolt 143 and nut 145, threaded bolt 128 and nut 130 can take a variety of forms.

In operation, as shown in FIGS. 21A-21D, the user can grasp lever 12 at the handle cover 230 and rotate the lever 12 away from the first jaw 14. That rotation causes the compression area 141 of the second jaw 16 to move away from the compression area 149 of the first jaw 14. The user can then place the material to be clamped 296 in between the compression areas 141 and 149. The user can then rotate the lever 12 back towards the compression area 149 of the first jaw 14. That rotation causes the compression area 141 of the second jaw 16 to move towards the compression area 149 of the first jaw 14. The result is that the teeth 84 of the first jaw 14 and the second jaw 16 become embedded into the material to be clamped. The clamp 10 is thus set. The user can then hang things from the clamp 10 via the aperture 24 of plate attachment 18.

Figure 13:
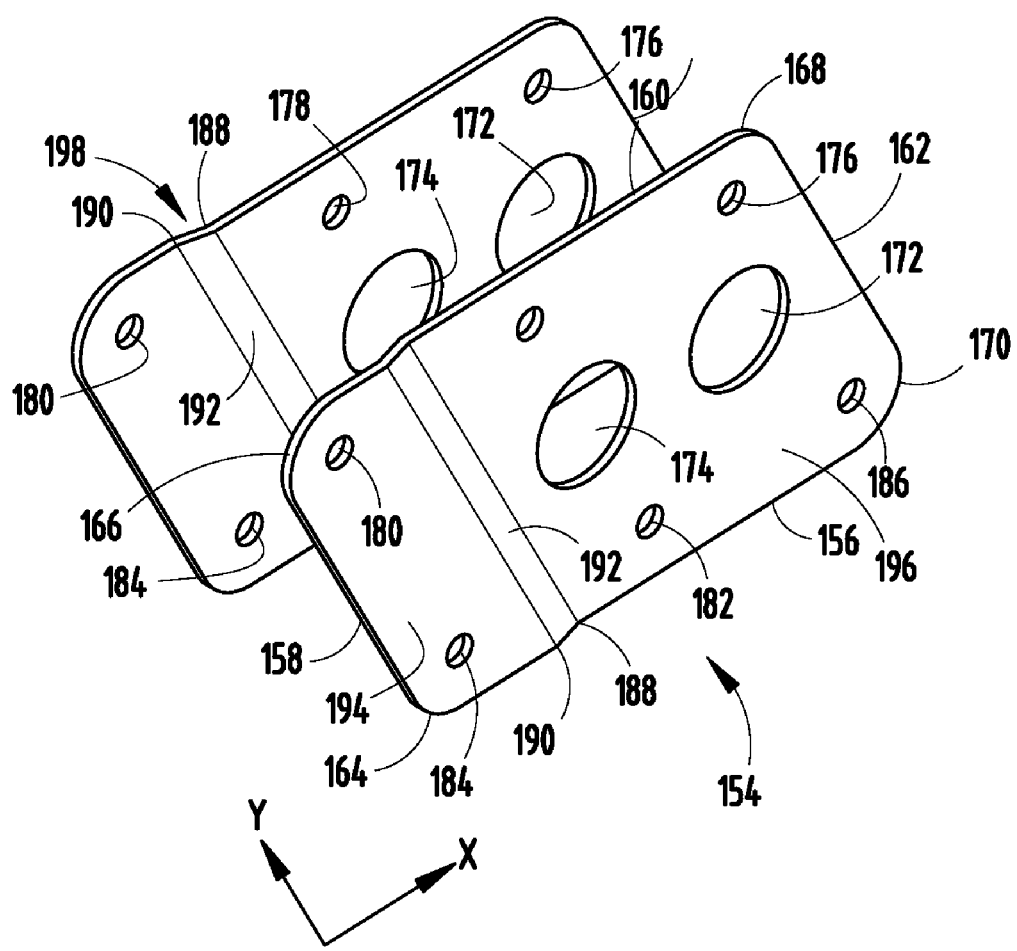
FIG. 13 shows a perspective view of the extension brackets used with the first embodiment.

First extension bracket 154 is shown at FIG. 13. First extension bracket 154 can have a first surface 156, second surface 158, third surface 160, and fourth surface 162. First surface 156 and third surface 160 each can be approximately 4.000 inches long. Second surface 158 and fourth surface 162 can be each approximately 2.100 inches long. Arc 164 can provide a greater than ninety degree arc at a radius of approximately 0.500 inches to transition from first surface 156 to second surface 158. Arc 166 can provide a less than ninety degree arc at a radius of approximately 0.500 inches to transition from second surface 158 to third surface 160. Arc 168 can provide a greater than ninety degree arc at a radius of approximately 0.500 inches to transition from third surface 160 to fourth surface 162. Arc 170 can provide a less than ninety degree arc at a radius of approximately 0.500 inches to transition from fourth surface 162 to first surface 156. Aperture 172 can be placed near the fourth surface 162. The center of aperture 172 can be equidistant from third surface 160 and first surface 156. Aperture 172 can have a diameter of approximately 1.000 inch. The center of aperture 174 can be approximately 1.500 inch away from the center of aperture 172 towards second surface 158 and parallel to the plane defined by first surface 156. Aperture 174 can have a diameter of approximately 1.000 inch. The center of aperture 176 can be approximately 1.050 inches from the center of aperture 172 in the y-axis direction. Aperture 176 can have a diameter of approximately 0.254 inches. The center of aperture 178 can be approximately 2.000 inches in the x-axis direction from the center of aperture 176. Aperture 178 can have a diameter of approximately 0.254 inches. The center of aperture 180 can be approximately 2.000 inches in the x-axis direction from the center of aperture 178. Aperture 180 can have a diameter of approximately 0.254 inches. The centers of apertures 176, 178, and 180 can all be on the same line and parallel to the plane defined by the third surface 160. The center of aperture 180 can be approximately 0.500 inches away from arc 166. The center of aperture 182 can be approximately 1.050 inches in the x-axis direction from the center of aperture 178 and 2.100 inches from the center of aperture 178 in the y-axis direction. Aperture 182 can have a diameter of approximately 0.254 inches. The center of aperture 184 can be approximately 2.000 inches in the x-axis direction from the center of aperture 182. Aperture 184 can have a diameter of approximately 0.254 inches. The center of aperture 186 can be approximately 2.000 inches in the x-axis direction from the center of aperture 182. Aperture 186 can have a diameter of approximately 0.254 inches. The centers of apertures 186, 182, and 184 can all be on the same line and parallel to the plane defined by first surface 156. The second extension bracket 198 has approximately the same features and dimensions as first extension bracket 154.

First extension bracket 154 can be bent at bend 188 and at bend 190. The result is bend surface 192. The bends 188 and 190 can be approximately 0.300 inches apart. Because of the bends 188 and 190, the plane defined by top surface 194 can be approximately 0.085 inches separated from the plane defined by top surface 196. Second extension bracket 198 can be bent at bend 188 and bend 190 in the opposite direction as the first extension bracket 154. The dimensions of the first extension bracket 154 and second extension bracket 198 can vary from those described above, as long as the dimensions of the other components of clamp 10 are adjusted accordingly.

Figure 14:
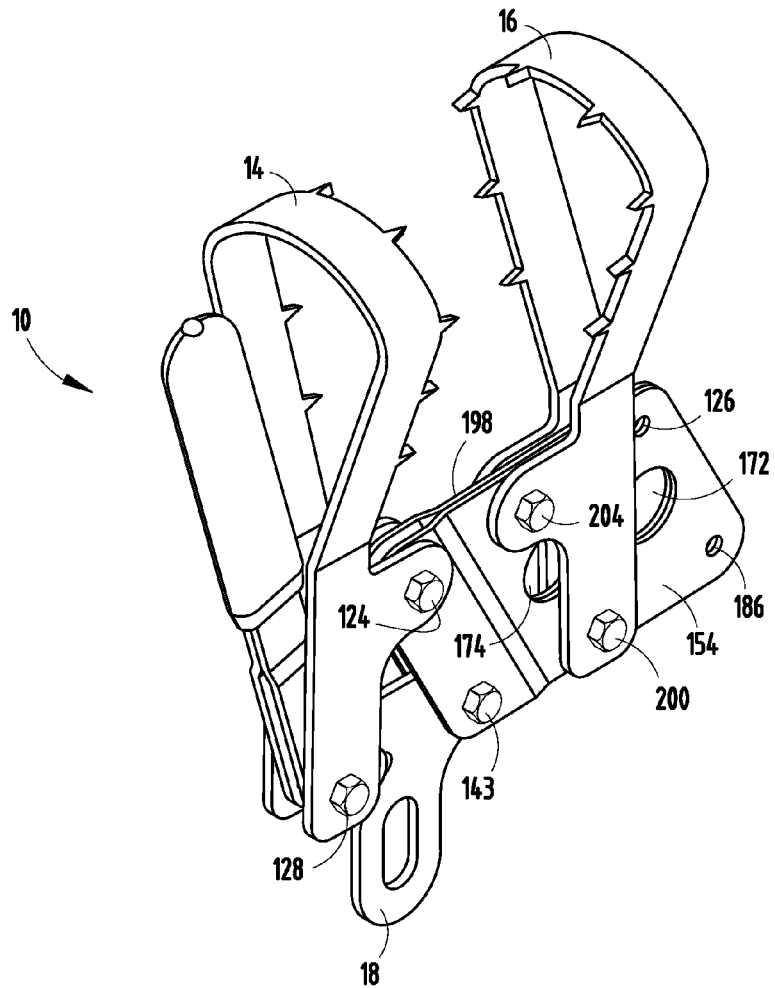
FIG. 14 shows a perspective view of the first embodiment with extension brackets.

As shown in FIG. 14, to apply the first extension bracket 154 and second extension bracket 198 to the clamp 10, threaded bolt 143 is placed through aperture 184 of the first extension bracket 154, through aperture 20 of the plate attachment 18, and through aperture 184 of the second extension bracket 198. Nut 145 is attached to the threaded end of threaded bolt 143. Threaded bolt 124 is placed through aperture 78 of the first jaw 14, through aperture 180 of the first extension bracket 154, through aperture 180 of the second extension bracket 198, and through aperture 98 of the first jaw 14. Nut 126 is attached to the threaded end of threaded bolt 124. Threaded bolt 200 is placed through aperture 72 of the second jaw 16, through aperture 182 of the first extension bracket 154, through aperture 182 of the second extension bracket 198, and through aperture 70 of the second jaw 16. Nut 202 is attached to the threaded end of threaded bolt 200. Threaded bolt 204 is placed through aperture 98 of the second jaw 16, through aperture 178 of the first extension bracket 154, through aperture 178 of the second extension bracket, and through aperture 78 of the second jaw 16. Nut 206 is attached to the threaded end of threaded bolt 204. The location of threaded bolt 128 remains the same as that described above for clamp 10 without the first and second extension brackets 154 and 198. Instead of using placing threaded bolts through apertures 182 and 178 of the first and second extension brackets 154 and 198, the user can provide an even wider extension by using apertures 186 and 176. As explained above, the threaded bolts and nuts could be replaced by other things, such as axles with deformed ends.

The use of the first extension bracket 154 and second extension bracket 198 allows the clamp 10 to grip wider material than the clamp 10 without the extension brackets 154 and 198. The clamp 10 is otherwise operated as discussed above.

Figure 15:
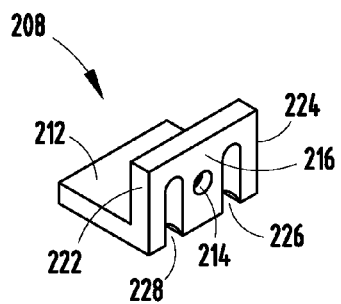
FIG. 15 shows a perspective view of a panel bracket that could be used with the first embodiment.
Figure 16:
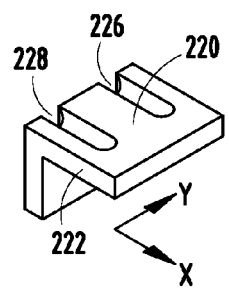
FIG. 16 shows another perspective view of the panel bracket.
Figure 17:
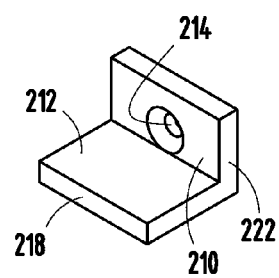
FIG. 17 shows another perspective view of the panel bracket.

Panel bracket 208 accessory is shown at FIGS. 15 through 17. Panel bracket 208 has a first surface 210, a second surface 212, aperture 214, third surface 216, fourth surface 218, fifth surface 220, sixth surface 222, seventh surface 224, recess 226, and recess 228. Aperture 214 can be open at first surface 210 and third surface 216. First surface 210 can be perpendicular to second surface 212, thus creating an L-shaped panel bracket. The distance between first surface 210 and third surface 216 can be approximately 0.25 inches. Fifth surface 220 can be approximately 1.25 inches in the x-axis direction and 1.50 inches in the y-axis direction. The distance between the plane defined by sixth surface 222 and seventh surface 224 can be 1.50 inches. The distance between the plane defined by second surface 212 and the end of first surface 210 can be approximately 0.75 inches. Aperture 214 can be centrally located between sixth surface 222 and seventh surface 224. Recess 226 and recess 228 can be approximately 0.25 inches in the y-axis direction. Recess 226 can be placed so that 0.225 inches of the fifth surface 220 remain before the seventh surface 224 edge of the fifth surface 220. Recess 228 can be placed so that 0.225 inches of the fifth surface 220 remain before the sixth surface 222 edge of the fifth surface 220. Recess 226 and recess 228 can be 180 degree recesses with a radius of approximately 0.125 inches. Recesses 226 and 228 proceed from the fifth surface 220 into the third surface 216.

Panel bracket 208 is attached to clamp 10 by placing threaded bolt 124 through aperture 214 of the panel bracket 208, through aperture 78 of the first jaw 14, through aperture 98 of the second jaw 16, through aperture 78 of the second jaw 16, and through aperture 98 of the first jaw 14. Nut 126 is attached to the threaded end of threaded bolt 124. Aperture 214 can be chamfered to hide the means of attachment to the clamp 10, such as threaded bolt 124. Panel bracket 208 can be plated with zinc via the barrel plating process. Panel bracket 208 allows the user to bracket something (such as a piece of wood) to the material upon which the clamp 10 is clamped. The dimensions of the panel bracket 208 can vary from those set forth above, to suit the needs of the user. For example, if the user wants to bracket a large piece of wood to the material upon which the clamp 10 is clamped, the user can increase the length and width of surface 212 and/or surface 210.

Figure 20:
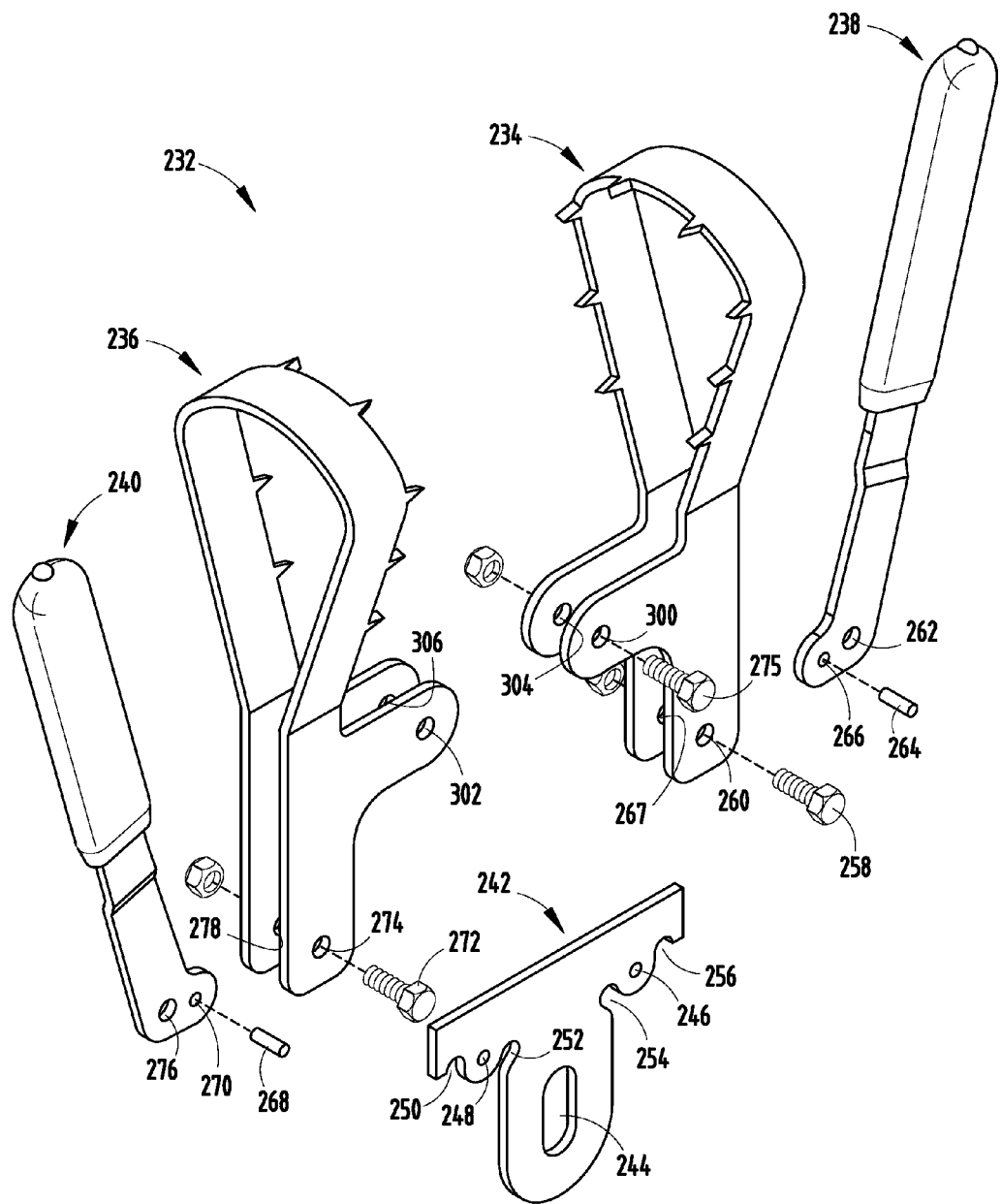
FIG. 20 shows a perspective exploded view of the second embodiment.
Figure 21A:
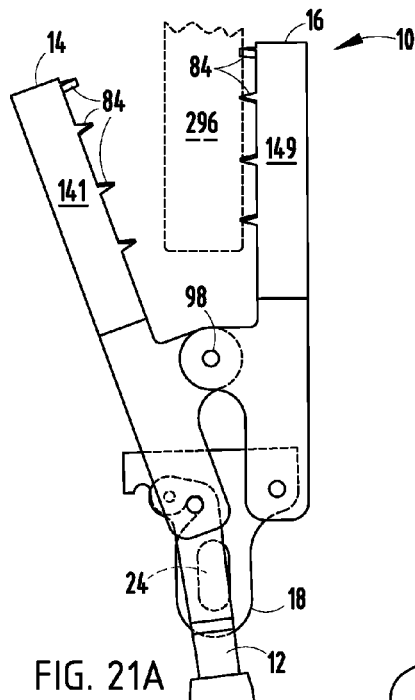
FIGS. 21A-D show a front view of the first embodiment being clamped to a piece of wood.
Figure 21B:
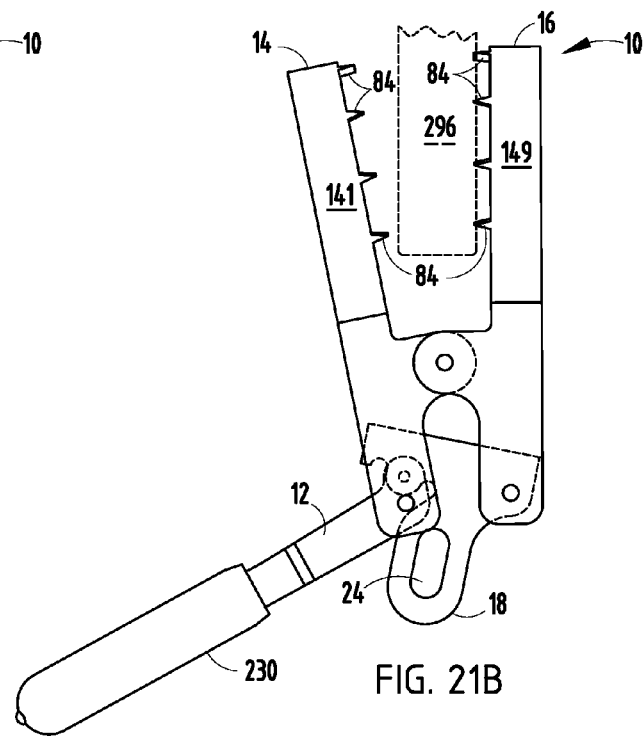
Figure 21C:
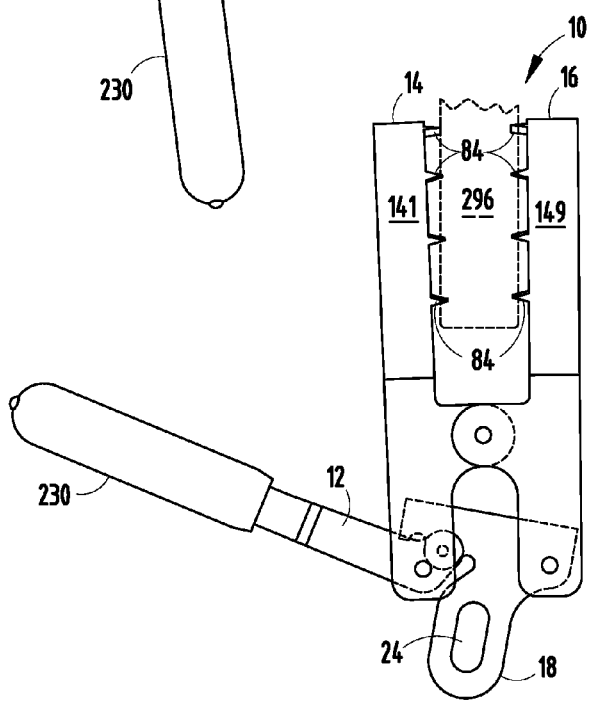
Figure 21D:
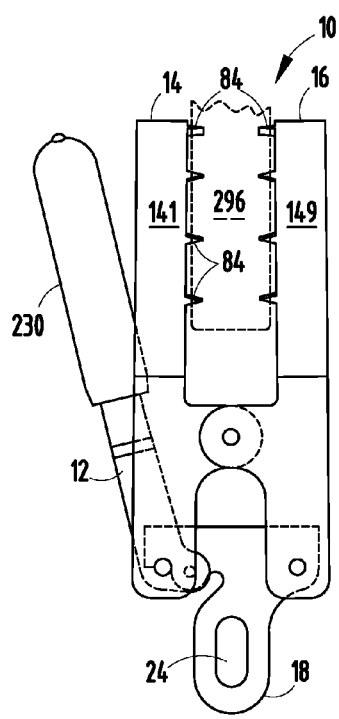

A second embodiment of the disclosure is shown at FIGS. 18 through 20. Clamp 232 can have first jaw 234, second jaw 236, first lever 238, second lever 240, and plate attachment 242. First jaw 234 can have the same dimensions and configuration as first jaw 14 described above. Second jaw 236 can have the same dimensions as first jaw 234. First lever 238 and second lever 240 can have the same dimensions and features as first piece 100 of lever 12 described above except that no bends are incorporated. Plate attachment 242 can have aperture 244, aperture 246, aperture 248, recession 250, recession 252, recession 254, and recession 256. Attachment pivot pin 264 is placed through aperture 266 of first lever 238 and aperture 246 of plate attachment 242 and secured into place. Attachment pivot pin 268 can be placed through aperture 270 of second lever 240 and through aperture 248 of the plate attachment 242 and secured into place.

Clamp 232 can be assembled by placing lever pivot pin 258 through aperture 260 in first jaw 234, through aperture 262 of first lever 238, adjacent to recession 254 (or recession 256) of plate attachment 242, and then through aperture 267 in first jaw 234. The lever pivot pin 258 can then be secured into place. Lever pivot pin 272 can be placed through aperture 274 in second jaw 236, through aperture 276 of second lever 240, adjacent to recession 250 (or recession 252) of plate attachment 242, and then through aperture 278 of second jaw 236. The lever pivot pin 272 can then be secured into place. Clamp body pivot pin 275 can be placed through aperture 300 at first jaw 234, through aperture 302 at second jaw 236, through aperture 304 at first jaw 234, and through aperture 306 at second jaw 236. Clamp body pivot pin 275 can be secured into place.

The user expands the first jaw 234 and the second jaw 236 by moving first lever 238 and/or second lever 240 towards plate attachment 242. The user compresses first jaw 234 and second jaw 236 by moving first lever 238 and/or second lever 240 away from plate attachment 242. After the clamp 232 is compressed around material, the user can then hang things from aperture 244.

What is claimed is:

1. A clamp comprising:
   a. a first jaw,
      i. the first jaw comprising a first aperture, a second aperture coaxially aligned with the first aperture of the first jaw, a third aperture, and a fourth aperture coaxially aligned with the third aperture of the first jaw,
   b. a second jaw,
      i. the second jaw comprising a first aperture, a second aperture coaxially aligned with the first aperture of the second jaw, a third aperture, and a fourth aperture coaxially aligned with the third aperture of the second jaw,
      ii. a first axle placed in the first aperture of the first jaw, the second aperture of the first jaw, the first aperture of the second jaw, and the second aperture of the second jaw,
   c. a lever,
      i. the lever comprising an integral first piece and an integral second piece in side to side relationship one to the other,
      ii. the first piece comprising a first aperture and a second aperture, the second piece comprising a first aperture and a second aperture each coaxially aligned with the first aperture and second aperture of the first piece, respectively,
      iii. a second axle placed in the third aperture of the first jaw, the second aperture of the first piece of the lever, the second aperture of the second piece of the lever, and the fourth aperture of the first jaw,
   d. and a plate attachment,
      i. the plate attachment comprising a first aperture, a second aperture, and a third aperture,
      ii. a third axle placed in the first aperture of the first piece of the lever, the first aperture of the plate attachment, and the first aperture of the second piece of the lever,
      iii. a fourth axle placed in the third aperture of the second jaw, the second aperture of the plate attachment, and the fourth aperture of the second jaw.

2. The clamp of claim 1, the first jaw further comprising teeth.

3. The clamp of claim 1, the second jaw further comprising teeth.

4. The clamp of claim 1, the plate attachment further comprising a first recession and a second recession,
   a. the second axle capable of pivoting, with the third axle acting as the pivot point, and the first recession and the second recession of the plate attachment acting as boundaries for the pivoting.

5. The clamp of claim 1, the lever further comprising a handle cover.

6. The clamp of claim 1 further comprising a panel bracket,
   a. the panel bracket comprising an aperture, a first surface, and a second surface,
   b. the aperture open on the first surface,
   c. the first surface being approximately perpendicular to the second surface,
   d. the first axle further placed into the aperture of the panel bracket.

* * * * *